US008265694B2

(12) United States Patent
Natarajan et al.

(10) Patent No.: US 8,265,694 B2
(45) Date of Patent: Sep. 11, 2012

(54) SYSTEM AND METHOD FOR STORING CONTACT INFORMATION IN DOCUMENT PROCESSING DEVICES

(75) Inventors: Giri Natarajan, La Palma, CA (US); Aksar Kanamkandy, Lake Forest, CA (US)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 141 days.

(21) Appl. No.: 12/828,363

(22) Filed: Jul. 1, 2010

(65) Prior Publication Data

US 2011/0081949 A1    Apr. 7, 2011

Related U.S. Application Data

(60) Provisional application No. 61/249,067, filed on Oct. 6, 2009.

(51) Int. Cl.
*H04B 1/38* (2006.01)
(52) U.S. Cl. .................. 455/557; 358/1.15; 358/400
(58) Field of Classification Search ............... None
See application file for complete search history.

(56) References Cited

U.S. PATENT DOCUMENTS

| | | | |
|---|---|---|---|
| 7,265,858 B2* | 9/2007 | Park et al. | 358/1.15 |
| 2008/0147771 A1* | 6/2008 | Bertolino | 709/201 |
| 2008/0176545 A1* | 7/2008 | Dicke et al. | 455/418 |
| 2009/0028179 A1* | 1/2009 | Albal | 370/465 |
| 2009/0222732 A1* | 9/2009 | Sodhi et al. | 715/733 |
| 2009/0280786 A1* | 11/2009 | Ziklik | 455/415 |
| 2010/0159875 A1* | 6/2010 | Bellows | 455/410 |
| 2010/0178902 A1* | 7/2010 | Boctor | 455/414.3 |
| 2011/0287814 A1* | 11/2011 | Lee et al. | 455/566 |

* cited by examiner

*Primary Examiner* — Ajit Patel
(74) *Attorney, Agent, or Firm* — SoCal IP Law Group LLP; Steven C. Sereboff; Jonathan Pearce

(57) ABSTRACT

The subject application is directed to a system and method for obtaining address data from a portable device to a document processing device. An address book, including address entries accessible via the document processing device, is stored in a data storage associated with a document processing device controller. Selection data is then received from an associated user, following which an address entry is retrieved from the address book. Document processing operations are then commenced in accordance with the retrieved address entries. A portable telecommunication device, proximate to the document processing device, is then discovered via a wireless transceiver. The portable device includes an integrated data storage containing contact data of contact information for contact destinations. After discovery, a data connection is established with the portable telecommunications device over which contact data is received. An entry is then added into the address book corresponding to the received contact data.

20 Claims, 11 Drawing Sheets

SYSTEM AND METHOD FOR STORING CONTACT INFORMATION IN DOCUMENT PROCESSING DEVICES

CROSS-REFERENCE TO RELATED APPLICATIONS

This application claims priority to U.S. Provisional Patent Application Ser. No. 61/249,067, filed on Oct. 6, 2009 titled "PERSONAL ADDRESS BOOK IN MFP FOR AUTHENTICATED USERS", the entirety of which is incorporated herein.

BACKGROUND OF THE INVENTION

The subject application is directed generally to storing contact information into document processing devices, including address books storing contact information. The application is particularly directed to adding address book information into a document processing device from portable data devices.

Modern document processing devices include copiers, printers, e-mail gateways, facsimile machines, and scanners. Many devices include two or more of these functions, and are referred to as multifunction peripherals (MFPs) or multifunction devices (MFDs). Document processing devices, particularly MFPs, often include embedded computers, referred to as controllers, to perform functions such as device control, data communication, user interface generation, device maintenance, and checking of device status.

Since document processing devices can be expensive, and require regular maintenance, including repair and replacement of consumables, devices are frequently shared among several users. Users of such devices will frequently have to provide contact information that they need to complete operations, such as a facsimile transmission. A user may add required information via entry at the device interface, such as a keyboard or touch screen on the device. However, manual addition of contact information is time consuming, and subject to error during entry. By way of example, a user may not be familiar with inputting contact information directly into a document processing device user interface. Doing so might tie up the device for an extended period, preventing other users from accessing the shared device. Also, a user may input such information incorrectly.

SUMMARY OF THE INVENTION

In accordance with one embodiment of the subject application, there is provided a system and method for obtaining address data from a portable device to a document processing device. An address book is stored in a data storage associated with a document processing device controller that includes a processor. The address book includes a plurality of address entries that are accessible via the document processing device. Selection data is then received from an associated user and at least one address entry in the address book is retrieved based upon this selection data. One or more document processing operations are then commenced on the document processing device in accordance with the one or more retrieved address entries. An associated portable telecommunication device proximate to the document processing device is then discovered via a wireless transceiver. The portable telecommunication device includes an integrated data storage that is configured to store contact data corresponding to contact information of one or more contact destinations. After discovery, a data connection is established with the portable telecommunications device. The contact data is then received from the portable telecommunications device. An entry is then added into the address book corresponding to the received contact data.

Still other advantages, aspects and features of the subject application will become readily apparent to those skilled in the art from the following description wherein there is shown and described a preferred embodiment of the subject application, simply by way of illustration of one of the best modes best suited to carry out the subject application. As it will be realized, the subject application is capable of other different embodiments and its several details are capable of modifications in various obvious aspects all without departing from the scope of the subject application. Accordingly, the drawings and descriptions will be regarded as illustrative in nature and not as restrictive.

BRIEF DESCRIPTION OF THE DRAWINGS

The subject application is described with reference to certain figures, including.

DETAILED DESCRIPTION OF THE PREFERRED EMBODIMENT

The subject application is directed to a system and method for storing contact information in address books. In particular, the subject application is directed to a system and method for communicating address book contact information from a portable device into a document processing device. More particularly, the subject application is directed to a system and method for obtaining address data from a portable device to a document processing device. It will become apparent to those skilled in the art that the system and method described herein are suitably adapted to a plurality of varying electronic fields employing portable telecommunication devices, including, for example and without limitation, communications, general computing, data processing, document processing, or the like. The preferred embodiment, as depicted in FIG. 1, illustrates a document processing field for example purposes only and is not a limitation of the subject application solely to such a field.

Figure 1:
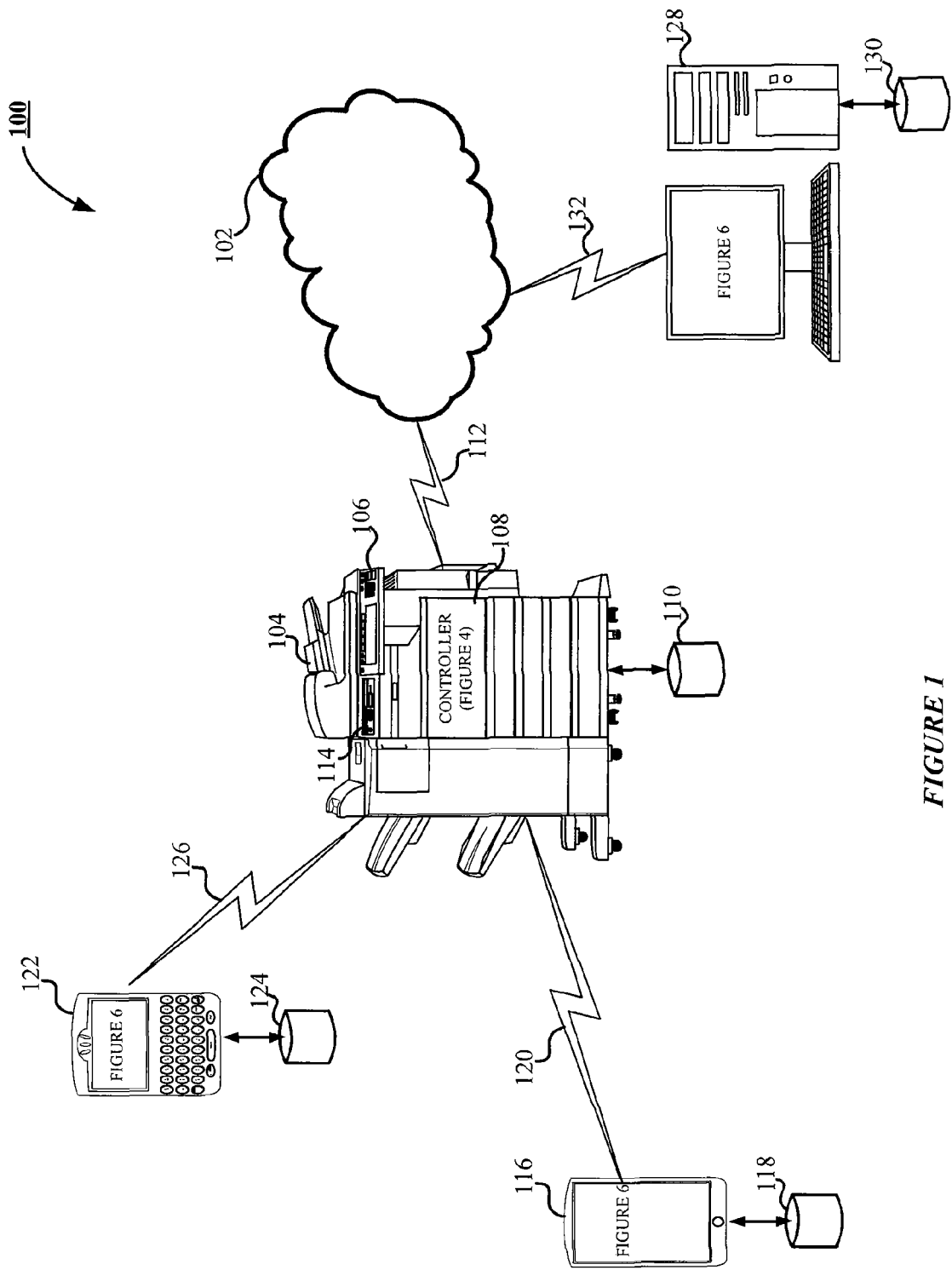
FIG. 1 is an overall diagram of a system for obtaining address data from a portable device to a document processing device according to one embodiment of the subject application.

Referring now to FIG. 1, there is shown an overall diagram of a type of system 100 for obtaining address data from a portable device to a document processing device in accordance with one embodiment of the subject application. As shown in FIG. 1, the system 100 is capable of implementation using a distributed computing environment, illustrated as a computer network 102. It will be appreciated by those skilled in the art that the computer network 102 is any distributed communications system known in the art capable of enabling the exchange of data between two or more electronic devices. The skilled artisan will further appreciate that the computer network 102 includes, for example and without limitation, a virtual local area network, a wide area network, a personal area network, a local area network, the Internet, an intranet, or any suitable combination thereof. In accordance with the preferred embodiment of the subject application, the computer network 102 is comprised of physical layers and transport layers, as illustrated by the myriad of conventional data transport mechanisms, such as, for example and without limitation, Token-Ring, 802.11(x), Ethernet, or other wireless or wire-based data communication mechanisms. The skilled artisan will appreciate that while a computer network 102 is shown in FIG. 1, the subject application is equally capable of use in a stand-alone system, as will be known in the art.

The system 100 also includes a document processing device 104, which is depicted in FIG. 1 as a multifunction peripheral device, suitably adapted to perform a variety of document processing operations. It will be appreciated by those skilled in the art that such document processing operations include, for example and without limitation, facsimile, scanning, copying, printing, electronic mail, document management, document storage, or the like. Suitable commercially available document processing devices include, for example and without limitation, the Toshiba e-Studio Series Controller. In accordance with one aspect of the subject application, the document processing device 104 is suitably adapted to provide remote document processing services to external or network devices. Preferably, the document processing device 104 includes hardware, software, and any suitable combination thereof, configured to interact with an associated user, a networked device, or the like.

According to one embodiment of the subject application, the document processing device 104 is suitably equipped to receive a plurality of portable storage media, including, without limitation, Firewire drive, USB drive, SD, MMC, XD, Compact Flash, Memory Stick, and the like. In the preferred embodiment of the subject application, the document processing device 104 further includes an associated user interface 106, such as a touchscreen, LCD display, touch-panel, alpha-numeric keypad, or the like, via which an associated user is able to interact directly with the document processing device 104. In accordance with the preferred embodiment of the subject application, the user interface 106 is advantageously used to communicate information to the associated user and receive selections from the associated user. The skilled artisan will appreciate that the user interface 106 comprises various components, suitably adapted to present data to the associated user, as are known in the art. In accordance with one embodiment of the subject application, the user interface 106 comprises a display, suitably adapted to display one or more graphical elements, text data, images, or the like, to an associated user, receive input from the associated user, and communicate the same to a backend component, such as the controller 108, as explained in greater detail below. Preferably, the document processing device 104 is communicatively coupled to the computer network 102 via a communications link 112. As will be understood by those skilled in the art, suitable communications links include, for example and without limitation, WiMax, 802.11a, 802.11b, 802.11g, 802.11(x), Bluetooth, the public switched telephone network, a proprietary communications network, infrared, optical, or any other suitable wired or wireless data transmission communications known in the art. The functioning of the document processing device 104 will be better understood in conjunction with the block diagrams illustrated in FIGS. 2 and 3, explained in greater detail below.

In accordance with one embodiment of the subject application, the document processing device 104 incorporates a backend component, designated as the controller 108, suitably adapted to facilitate the operations of the document processing device 104, as will be understood by those skilled in the art. Preferably, the controller 108 is embodied as hardware, software, or any suitable combination thereof, configured to control the operations of the associated document processing device 104, facilitate the display of images via the user interface 106, direct the manipulation of electronic image data, and the like. For purposes of explanation, the controller 108 is used to refer to any myriad of components associated with the document processing device 104, including hardware, software, or combinations thereof, functioning to perform, cause to be performed, control, or otherwise direct the methodologies described hereinafter. It will be understood by those skilled in the art that the methodologies described with respect to the controller 108 is capable of being performed by any general purpose computing system, known in the art, and thus the controller 108 is representative of such general computing devices and is intended as such when used hereinafter. Furthermore, the use of the controller 108 hereinafter is for the example embodiment only, and other embodiments, which will be apparent to one skilled in the art, are capable of employing the system and method for obtaining address data from a portable device to a document processing device. The functioning of the controller 108 will better be understood in conjunction with the block diagrams illustrated in FIGS. 4 and 5, explained in greater detail below.

Communicatively coupled to the document processing device 104 is a data storage device 110. In accordance with the one embodiment of the subject application, the data storage device 110 is any mass storage device known in the art including, for example and without limitation, magnetic storage drives, a hard disk drive, optical storage devices, flash memory devices, or any suitable combination thereof. In one embodiment, the data storage device 110 is suitably adapted to store scanned image data, modified image data, redacted data, user information, document data, image data, electronic database data, or the like. It will be appreciated by those skilled in the art that while illustrated in FIG. 1 as being a separate component of the system 100, the data storage device 110 is capable of being implemented as an internal storage component of the document processing device 104, a component of the controller 108, or the like, such as, for example and without limitation, an internal hard disk drive, or the like. In accordance with one embodiment of the subject application, the data storage device 110 is capable of storing document processing instructions, usage data, user interface data, job control data, controller status data, component execution data, images, advertisements, user information, location information, output templates, mapping data, multimedia data files, fonts, and the like. The document processing device of FIG. 1 also includes a portable storage device reader 114, which is suitably adapted to receive and access a myriad of different portable storage devices. Examples of such portable storage devices include, for example and without limitation, flash-based memory such as SD, xD, Memory Stick, compact flash, CD-ROM, DVD-ROM, USB flash drives, or other magnetic or optical storage devices, as will be known in the art.

Also depicted in FIG. 1 is a plurality of user devices, illustrated as portable telecommunications devices 116 and 122. Each portable telecommunications device 116 and 122 is preferably in data communication with the document processing device 104 via corresponding communications links 120 and 126. It will be appreciated by those skilled in the art that the portable telecommunication devices 116 and 122 are shown in FIG. 1 as a smart cellular telephone and a portable electronic mail device for illustration purposes only. As will be understood by those skilled in the art, the portable telecommunication devices 116 and 122 are representative of any personal computing device known in the art including, for example and without limitation, a laptop computer, a personal computer, a personal data assistant, a web-enabled cellular telephone, a smart phone, a proprietary network device, or other web-enabled electronic device. According to one embodiment of the subject application, the portable telecommunication devices 116 and 122 further include software, hardware, or a suitable combination thereof configured to interact with the document processing device 104 or the like. Preferably, each portable telecommunication device 116 and 122 includes a suitable personal area network interface, such as a BLUETOOTH transceiver, an RF transceiver, and the like.

The communications links 120 and 126 are any suitable channel of data communications known in the art including, but not limited to wireless communications, for example and without limitation, BLUETOOTH, WiMax, 802.11a, 802.11b, 802.11g, 802.11(x), a proprietary communications channel, infrared, optical, the public switched telephone network, or any suitable wireless data transmission system, or wired communications known in the art. Preferably, the portable telecommunication devices 116 and 122 are suitably adapted to provide contact information, address book data, document data, job data, user interface data, image data, monitor document processing jobs, employ thin-client interfaces, generate display data, generate output data, or the like, with respect to the document processing device 104, or any other similar device with which the portable telecommunication devices 116 and 122 are capable of communicating. According to one embodiment of the subject application, the portable telecommunication devices 116 and 122 are capable of implementing various graphical user interface applications for interacting with a user, as will be appreciated by those skilled in the art to include a physical keyboard, a soft keyboard via an associated touch screen interface, or a suitable combination thereof. The functioning of the portable telecommunication devices 116 and 122 will better be understood in conjunction with the block diagram illustrated in FIG. 6, explained in greater detail below.

Communicatively coupled to the portable telecommunication devices 116 and 122 are data storage devices 118 and 124, respectively. According to the foregoing example embodiment, the data storage devices 118 and 124 are any mass storage device, or plurality of such devices, known in the art including, for example and without limitation, magnetic storage drives, a hard disk drive, optical storage devices, flash memory devices, or any suitable combination thereof. In such an embodiment, the data storage devices 118 and 124 are suitably adapted to store operating systems, address book data, personal information, account information, identification data, regional data, thin client interface data, keyboard layout data, keyboard property data, HTML keyboard data, JavaScript keyboard data, update software, policy information, and the like. It will be appreciated by those skilled in the art that while illustrated in FIG. 1 as being a separate component of the system 100, the data storage devices 118 and 124 are capable of being implemented as an internal storage component of the portable telecommunication devices 116 and 122.

FIG. 1 further illustrates a networked data processing device, illustrated as the computer workstation 128. The computer workstation 128 is preferably in data communication with the computer network 102 via the communication link 132. It will be appreciated by those skilled in the art that the computer workstation 128 is shown in FIG. 1 as a personal computer for illustration purposes only. As will be understood by those skilled in the art, the computer workstation 128 is representative of any personal computing device known in the art including, for example and without limitation, a laptop computer, a personal computer, a personal data assistant, a web-enabled cellular telephone, a smart phone, a proprietary network device, or other web-enabled electronic device capable of network communications. According to one embodiment of the subject application, the workstation 128 includes software, hardware, or a suitable combination thereof configured to interact with the document processing device 104, the portable telecommunication devices 116 and 122, or the like.

The communication link 132 is any suitable channel of data communications known in the art including, but not limited to wireless communications, for example and without limitation, BLUETOOTH, WiMax, 802.11a, 802.11b, 802.11g, 802.11(x), a proprietary communications channel, infrared, optical, the public switched telephone network, or any suitable wireless data transmission system, or wired communications known in the art. Preferably, the computer workstation 128 is suitably adapted to provide or receive contact information, address book data, document data, job data, user interface data, image data, monitor document processing jobs, employ thin-client interfaces, generate display data, generate output data, or the like, with respect to the document processing device 104, or any other similar device coupled to the computer network 102. According to one embodiment of the subject application, the computer workstation 128 is capable of implementing various graphical user interface applications for interacting with a user, as will be appreciated by those skilled in the art to include a physical keyboard, a soft keyboard via an associated touch screen interface, or a suitable combination thereof. The functioning of the computer workstation 128 will better be understood in conjunction with the block diagram illustrated in FIG. 6, explained in greater detail below.

Communicatively coupled to the computer workstation 128 is a data storage device 130. According to one embodiment of the subject application, the data storage device 130 is any mass storage device, or plurality of such devices, known in the art including, for example and without limitation, magnetic storage drives, a hard disk drive, optical storage devices, flash memory devices, or any suitable combination thereof. In such an embodiment, the data storage device 130 is suitably adapted to store operating systems, address book data, personal information, account information, identification data, regional data, thin client interface data, keyboard layout data, keyboard property data, HTML keyboard data, JavaScript keyboard data, update software, policy information, and the like. It will be appreciated by those skilled in the art that while illustrated in FIG. 1 as being a separate component of the system 100, the data storage device 130 is capable of being implemented as an internal storage component of the computer workstation 128.

Figure 2:
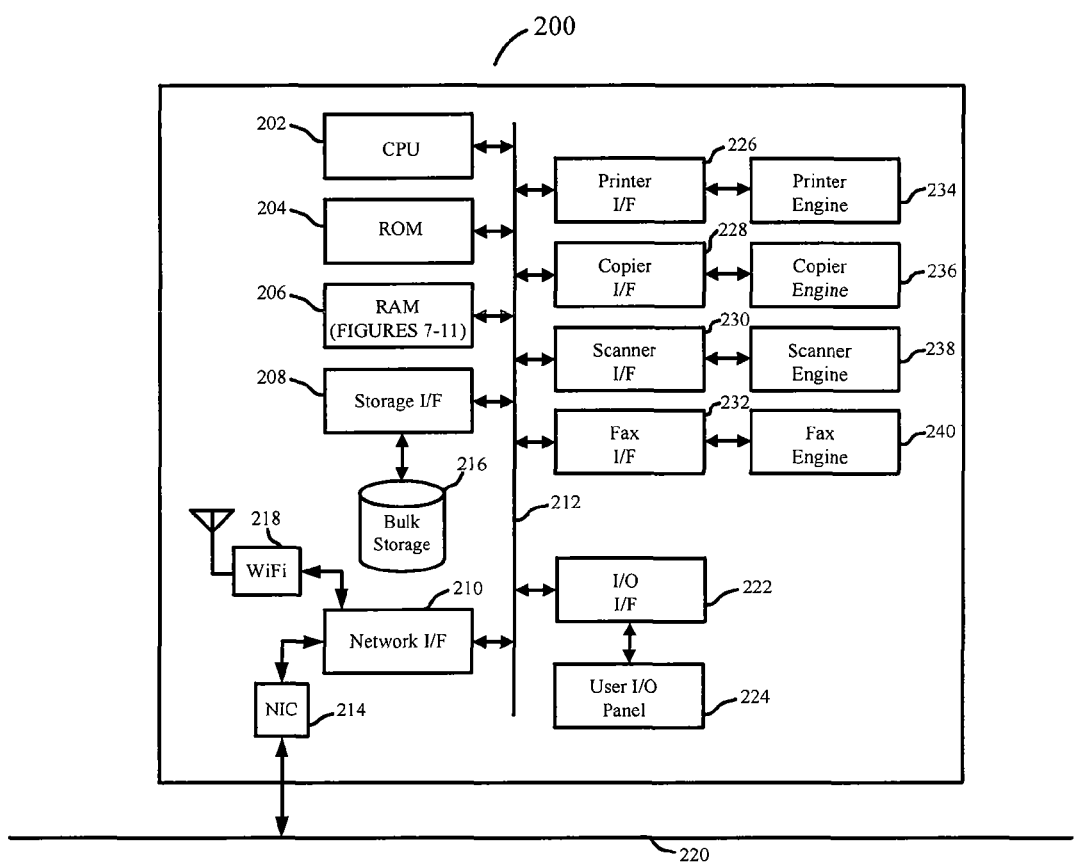
FIG. 2 is a block diagram illustrating device hardware for use in the system for obtaining address data from a portable device to a document processing device according to one embodiment of the subject application.

Turning now to FIG. 2, illustrated is a representative architecture of a suitable device 200, shown in FIG. 1 as the document processing device 104, on which operations of the subject system are completed. Included is a processor 202, suitably comprised of a central processor unit. However, it will be appreciated that the processor 202 may advantageously be composed of multiple processors working in concert with one another as will be appreciated by one of ordinary skill in the art. Also included is a non-volatile or read only memory 204 which is advantageously used for static or fixed data or instructions, such as BIOS functions, system functions, system configuration data, and other routines or data used for operation of the device 200.

Also included in the device 200 is random access memory 206, suitably formed of dynamic random access memory, static random access memory, or any other suitable, addressable memory system. Random access memory provides a storage area for data instructions associated with applications and data handling accomplished by the processor 202.

A storage interface 208 suitably provides a mechanism for volatile, bulk or long term storage of data associated with the device 200. The storage interface 208 suitably uses bulk storage, such as any suitable addressable or serial storage, such as a disk, optical, tape drive and the like as shown as 216, as well as any suitable storage medium as will be appreciated by one of ordinary skill in the art.

A network interface subsystem 210 suitably routes input and output from an associated network allowing the device 200 to communicate to other devices. The network interface subsystem 210 suitably interfaces with one or more connections with external devices to the device 200. By way of example, illustrated is at least one network interface card 214 for data communication with fixed or wired networks, such as Ethernet, token ring, and the like, and a wireless interface 218, suitably adapted for wireless communication via means such as WiFi, WiMax, wireless modem, cellular network, or any suitable wireless communication system. It is to be appreciated however, that the network interface subsystem suitably utilizes any physical or non-physical data transfer layer or protocol layer as will be appreciated by one of ordinary skill in the art. In the illustration, the network interface card 214 is interconnected for data interchange via a physical network 220, suitably comprised of a local area network, wide area network, or a combination thereof.

Data communication between the processor 202, read only memory 204, random access memory 206, storage interface 208 and the network subsystem 210 is suitably accomplished via a bus data transfer mechanism, such as illustrated by the bus 212.

Suitable executable instructions on the device 200 facilitate communication with a plurality of external devices, such as workstations, document rendering devices, other servers, or the like. While, in operation, a typical device operates autonomously, it is to be appreciated that direct control by a local user is sometimes desirable, and is suitably accomplished via an optional input/output interface 222 to a user input/output panel 224 as will be appreciated by one of ordinary skill in the art.

Also in data communication with the bus 212 are interfaces to one or more document processing engines. In the illustrated embodiment, printer interface 226, copier interface 228, scanner interface 230, and facsimile interface 232 facilitate communication with printer engine 234, copier engine 236, scanner engine 238, and facsimile engine 240, respectively. It is to be appreciated that the device 200 suitably accomplishes one or more document processing functions. Systems accomplishing more than one document processing operation are commonly referred to as multifunction peripherals or multifunction devices.

Figure 3:
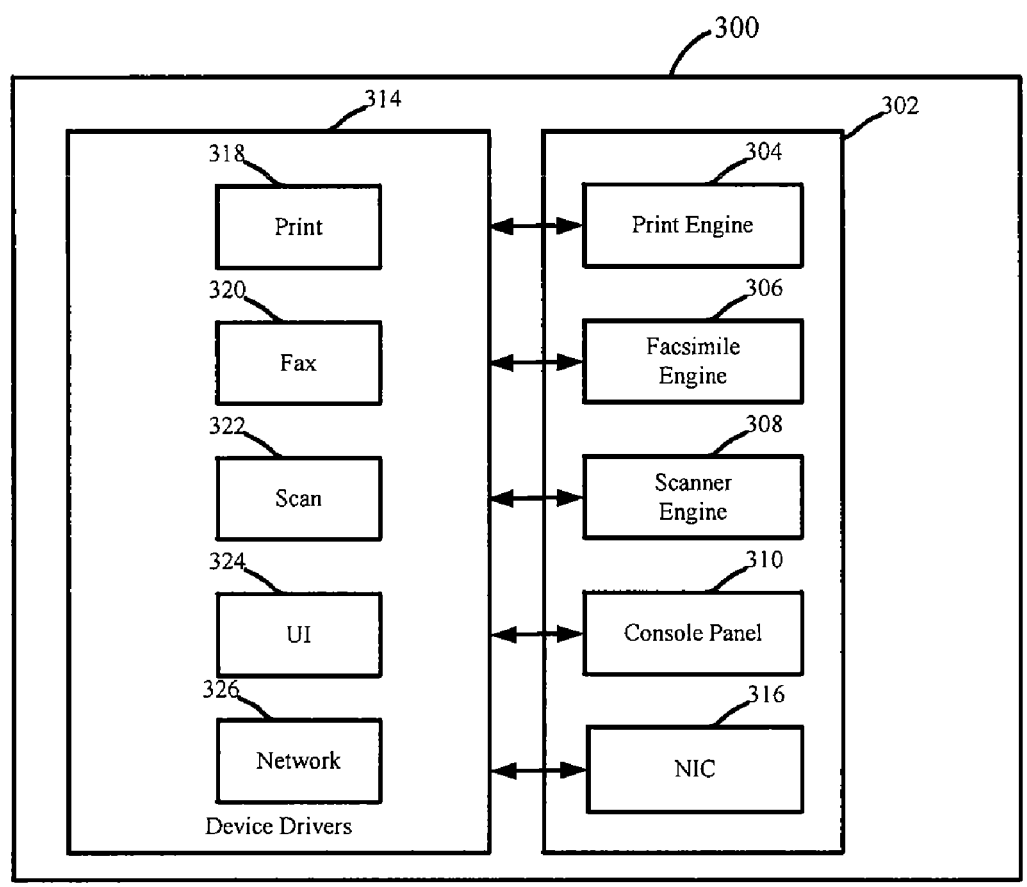
FIG. 3 is a functional diagram illustrating the device for use in the system for obtaining address data from a portable device to a document processing device according to one embodiment of the subject application.

Turning now to FIG. 3, illustrated is a suitable document processing device, depicted in FIG. 1 as the document processing device 104, for use in connection with the disclosed system. FIG. 3 illustrates suitable functionality of the hardware of FIG. 2 in connection with software and operating system functionality as will be appreciated by one of ordinary skill in the art. The document rendering device 300 suitably includes an engine 302 which facilitates one or more document processing operations.

The document processing engine 302 suitably includes a print engine 304, facsimile engine 306, scanner engine 308 and console panel 310. The print engine 304 allows for output of physical documents representative of an electronic document communicated to the processing device 300. The facsimile engine 306 suitably communicates to or from external facsimile devices via a device, such as a fax modem.

The scanner engine 308 suitably functions to receive hard copy documents and in turn image data corresponding thereto. A suitable user interface, such as the console panel 310, suitably allows for input of instructions and display of information to an associated user. It will be appreciated that the scanner engine 308 is suitably used in connection with input of tangible documents into electronic form in bit-mapped, vector, or page description language format, and is also suitably configured for optical character recognition. Tangible document scanning also suitably functions to facilitate facsimile output thereof.

In the illustration of FIG. 3, the document processing engine also comprises an interface 316 with a network via driver 326, suitably comprised of a network interface card. It will be appreciated that a network thoroughly accomplishes that interchange via any suitable physical and non-physical layer, such as wired, wireless, or optical data communication.

The document processing engine 302 is suitably in data communication with one or more device drivers 314, which device drivers allow for data interchange from the document processing engine 302 to one or more physical devices to accomplish the actual document processing operations. Such document processing operations include one or more of printing via driver 318, facsimile communication via driver 320, scanning via driver 322 and a user interface functions via driver 324. It will be appreciated that these various devices are integrated with one or more corresponding engines associated with the document processing engine 302. It is to be appreciated that any set or subset of document processing operations are contemplated herein. Document processors which include a plurality of available document processing options are referred to as multi-function peripherals.

Figure 4:
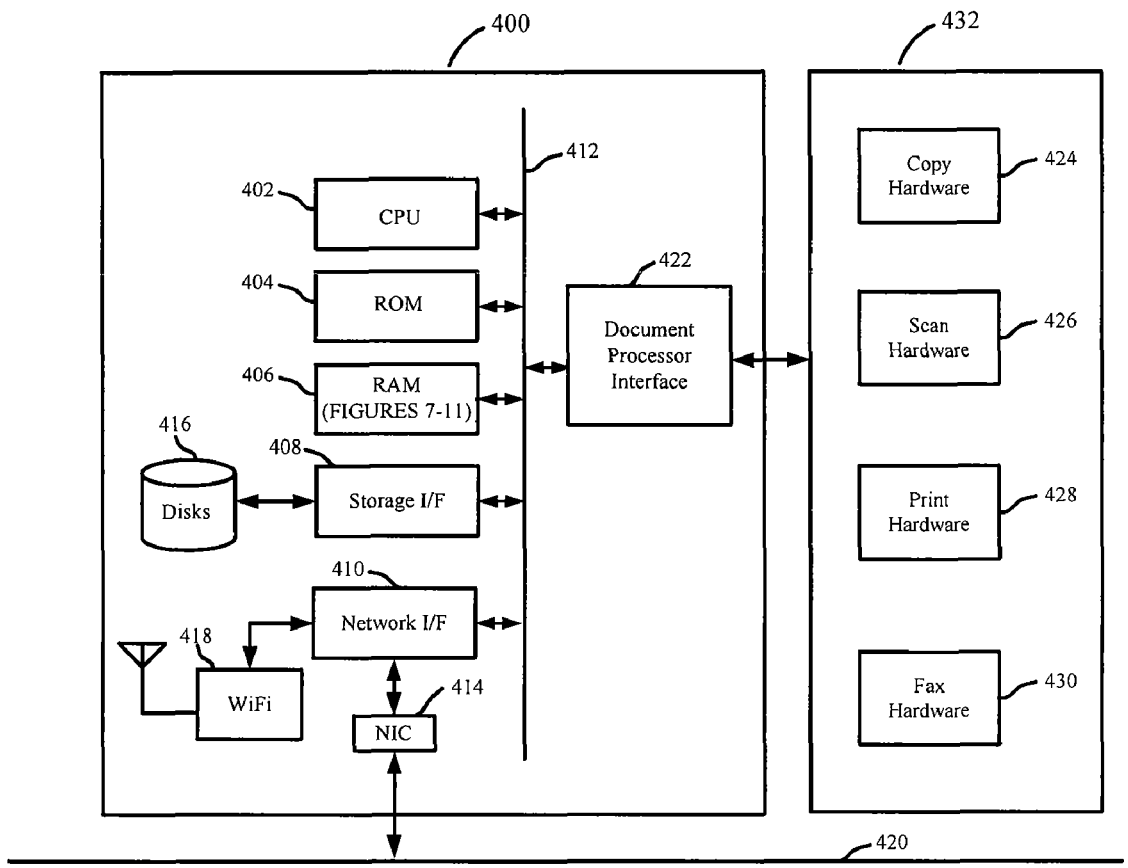
FIG. 4 is a block diagram illustrating controller hardware for use in the system for obtaining address data from a portable device to a document processing device according to one embodiment of the subject application.

Turning now to FIG. 4, illustrated is a representative architecture of a suitable backend component, i.e., the controller 400, shown in FIG. 1 as the controller 108, on which operations of the subject system 100 are completed. The skilled artisan will understand that the controller 400 is representative of any general computing device, known in the art, capable of facilitating the methodologies described herein. Included is a processor 402, suitably comprised of a central processor unit. However, it will be appreciated that processor 402 may advantageously be composed of multiple processors working in concert with one another as will be appreciated by one of ordinary skill in the art. Also included is a non-volatile or read only memory 404 which is advantageously used for static or fixed data or instructions, such as BIOS functions, system functions, system configuration data, and other routines or data used for operation of the controller 400.

Also included in the controller 400 is random access memory 406, suitably formed of dynamic random access memory, static random access memory, or any other suitable, addressable and writable memory system. Random access memory provides a storage area for data instructions associated with applications and data handling accomplished by processor 402.

A storage interface 408 suitably provides a mechanism for non-volatile, bulk or long term storage of data associated with the controller 400. The storage interface 408 suitably uses bulk storage, such as any suitable addressable or serial storage, such as a disk, optical, tape drive and the like as shown as 416, as well as any suitable storage medium as will be appreciated by one of ordinary skill in the art.

A network interface subsystem 410 suitably routes input and output from an associated network allowing the controller 400 to communicate to other devices. The network interface subsystem 410 suitably interfaces with one or more connections with external devices to the device 400. By way of example, illustrated is at least one network interface card 414 for data communication with fixed or wired networks, such as Ethernet, token ring, and the like, and a wireless interface 418, suitably adapted for wireless communication via means such as WiFi, WiMax, wireless modem, cellular network, or any suitable wireless communication system. It is to be appreciated however, that the network interface subsystem suitably utilizes any physical or non-physical data transfer layer or protocol layer as will be appreciated by one of ordinary skill in the art. In the illustration, the network interface 414 is interconnected for data interchange via a physical network 420, suitably comprised of a local area network, wide area network, or a combination thereof.

Data communication between the processor 402, read only memory 404, random access memory 406, storage interface 408 and the network interface subsystem 410 is suitably accomplished via a bus data transfer mechanism, such as illustrated by bus 412.

Also in data communication with the bus 412 is a document processor interface 422. The document processor interface 422 suitably provides connection with hardware 432 to perform one or more document processing operations. Such operations include copying accomplished via copy hardware 424, scanning accomplished via scan hardware 426, printing accomplished via print hardware 428, and facsimile communication accomplished via facsimile hardware 430. It is to be appreciated that the controller 400 suitably operates any or all of the aforementioned document processing operations. Systems accomplishing more than one document processing operation are commonly referred to as multifunction peripherals or multifunction devices.

Figure 5:
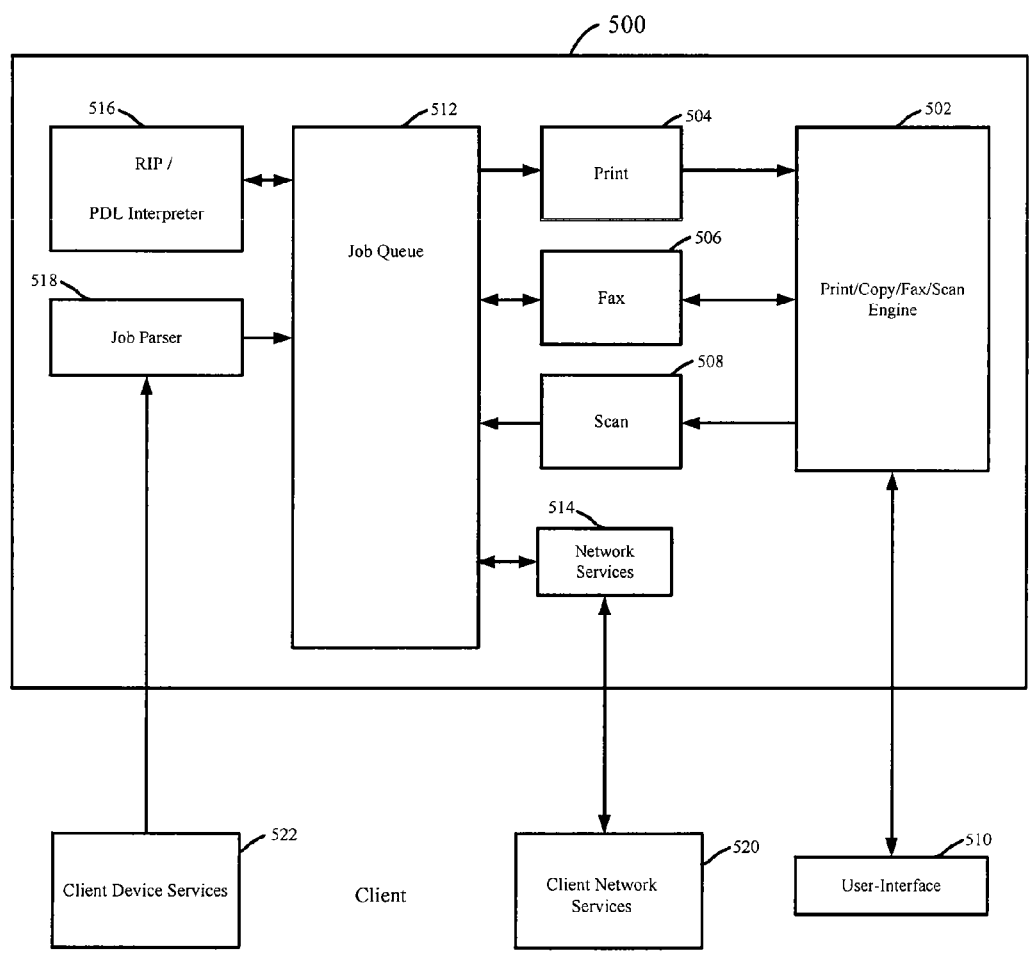
FIG. 5 is a functional diagram illustrating the controller for use in the system for obtaining address data from a portable device to a document processing device according to one embodiment of the subject application.

Functionality of the subject system 100 is accomplished on a suitable document rendering device, such as the document processing device 104, which includes the controller 400 of FIG. 4, (shown in FIG. 1 as the controller 108) as an intelligent subsystem associated with a document rendering device. In the illustration of FIG. 5, controller function 500 in the preferred embodiment, includes a document processing engine 502. A suitable controller functionality is that incorporated into the Toshiba e-Studio system in the preferred embodiment. FIG. 5 illustrates suitable functionality of the hardware of FIG. 4 in connection with software and operating system functionality as will be appreciated by one of ordinary skill in the art.

In the preferred embodiment, the engine 502 allows for printing operations, copy operations, facsimile operations and scanning operations. This functionality is frequently associated with multi-function peripherals, which have become a document processing peripheral of choice in the industry. It will be appreciated, however, that the subject controller does not have to have all such capabilities. Controllers are also advantageously employed in dedicated or more limited purposes document rendering devices that perform one or more of the document processing operations listed above.

The engine 502 is suitably interfaced to a user interface panel 510, which panel allows for a user or administrator to access functionality controlled by the engine 502. Access is suitably enabled via an interface local to the controller, or remotely via a remote thin or thick client.

The engine 502 is in data communication with the print function 504, facsimile function 506, and scan function 508. These functions facilitate the actual operation of printing, facsimile transmission and reception, and document scanning for use in securing document images for copying or generating electronic versions.

A job queue 512 is suitably in data communication with the print function 504, facsimile function 506, and scan function 508. It will be appreciated that various image forms, such as bit map, page description language or vector format, and the like, are suitably relayed from the scan function 308 for subsequent handling via the job queue 512.

The job queue 512 is also in data communication with network services 514. In a preferred embodiment, job control, status data, or electronic document data is exchanged between the job queue 512 and the network services 514. Thus, suitable interface is provided for network based access to the controller function 500 via client side network services 520, which is any suitable thin or thick client. In the preferred embodiment, the web services access is suitably accomplished via a hypertext transfer protocol, file transfer protocol, uniform data diagram protocol, or any other suitable exchange mechanism. The network services 514 also advantageously supplies data interchange with client side services 520 for communication via FTP, electronic mail, TELNET, or the like. Thus, the controller function 500 facilitates output or receipt of electronic document and user information via various network access mechanisms.

The job queue 512 is also advantageously placed in data communication with an image processor 516. The image processor 516 is suitably a raster image process, page description language interpreter or any suitable mechanism for interchange of an electronic document to a format better suited for interchange with device functions such as print 504, facsimile 506 or scan 508.

Finally, the job queue 512 is in data communication with a parser 518, which parser suitably functions to receive print job language files from an external device, such as client device services 522. The client device services 522 suitably include printing, facsimile transmission, or other suitable input of an electronic document for which handling by the controller function 500 is advantageous. The parser 518 functions to interpret a received electronic document file and relay it to the job queue 512 for handling in connection with the afore-described functionality and components.

Figure 6:
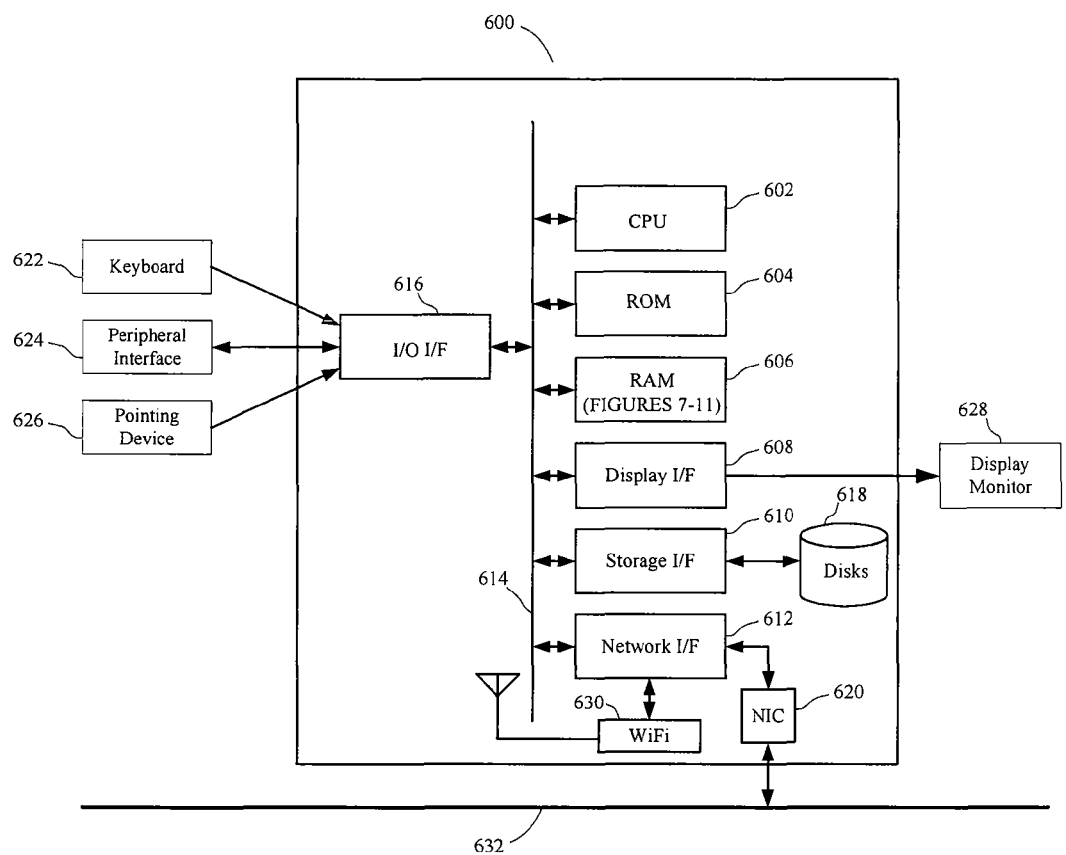
FIG. 6 is a functional diagram illustrating a workstation for use in the system for obtaining address data from a portable device to a document processing device according to one embodiment of the subject application.

Turning now to FIG. 6, illustrated is a hardware diagram of a suitable workstation 600, shown in FIG. 1 as the portable telecommunication devices 116 and 122 or the workstation 128, for use in connection with the subject system. A suitable workstation includes a processor unit 602 which is advantageously placed in data communication with read only memory 604, suitably non-volatile read only memory, volatile read only memory or a combination thereof, random access memory 606, display interface 608, storage interface 610, and network interface 612. In a preferred embodiment, interface to the foregoing modules is suitably accomplished via a bus 614.

The read only memory 604 suitably includes firmware, such as static data or fixed instructions, such as BIOS, system functions, configuration data, and other routines used for operation of the workstation 600 via CPU 602.

The random access memory 606 provides a storage area for data and instructions associated with applications and data handling accomplished by the processor 602.

The display interface 608 receives data or instructions from other components on the bus 614, which data is specific to generating a display to facilitate a user interface. The display interface 608 suitably provides output to a display terminal 628, suitably a video display device such as a monitor, LCD, plasma, or any other suitable visual output device as will be appreciated by one of ordinary skill in the art.

The storage interface 610 suitably provides a mechanism for non-volatile, bulk or long term storage of data or instructions in the workstation 600. The storage interface 610 suitably uses a storage mechanism, such as storage 618, suitably comprised of a disk, tape, CD, DVD, or other relatively higher capacity addressable or serial storage medium.

The network interface 612 suitably communicates to at least one other network interface, shown as network interface 620, such as a network interface card, and wireless network interface 630, such as a WiFi wireless network card. It will be appreciated that by one of ordinary skill in the art that a suitable network interface is comprised of both physical and protocol layers and is suitably any wired system, such as Ethernet, token ring, or any other wide area or local area network communication system, or wireless system, such as WiFi, WiMax, or any other suitable wireless network system, as will be appreciated by one of ordinary skill in the art. In the illustration, the network interface 620 is interconnected for data interchange via a physical network 632, suitably comprised of a local area network, wide area network, or a combination thereof.

An input/output interface 616 in data communication with the bus 614 is suitably connected with an input device 622, such as a keyboard or the like. The input/output interface 616 also suitably provides data output to a peripheral interface 624, such as a USB, universal serial bus output, SCSI, Firewire (IEEE 1394) output, or any other interface as may be appropriate for a selected application. Finally, the input/output interface 616 is suitably in data communication with a pointing device interface 626 for connection with devices, such as a mouse, light pen, touch screen, or the like.

Figure 7:
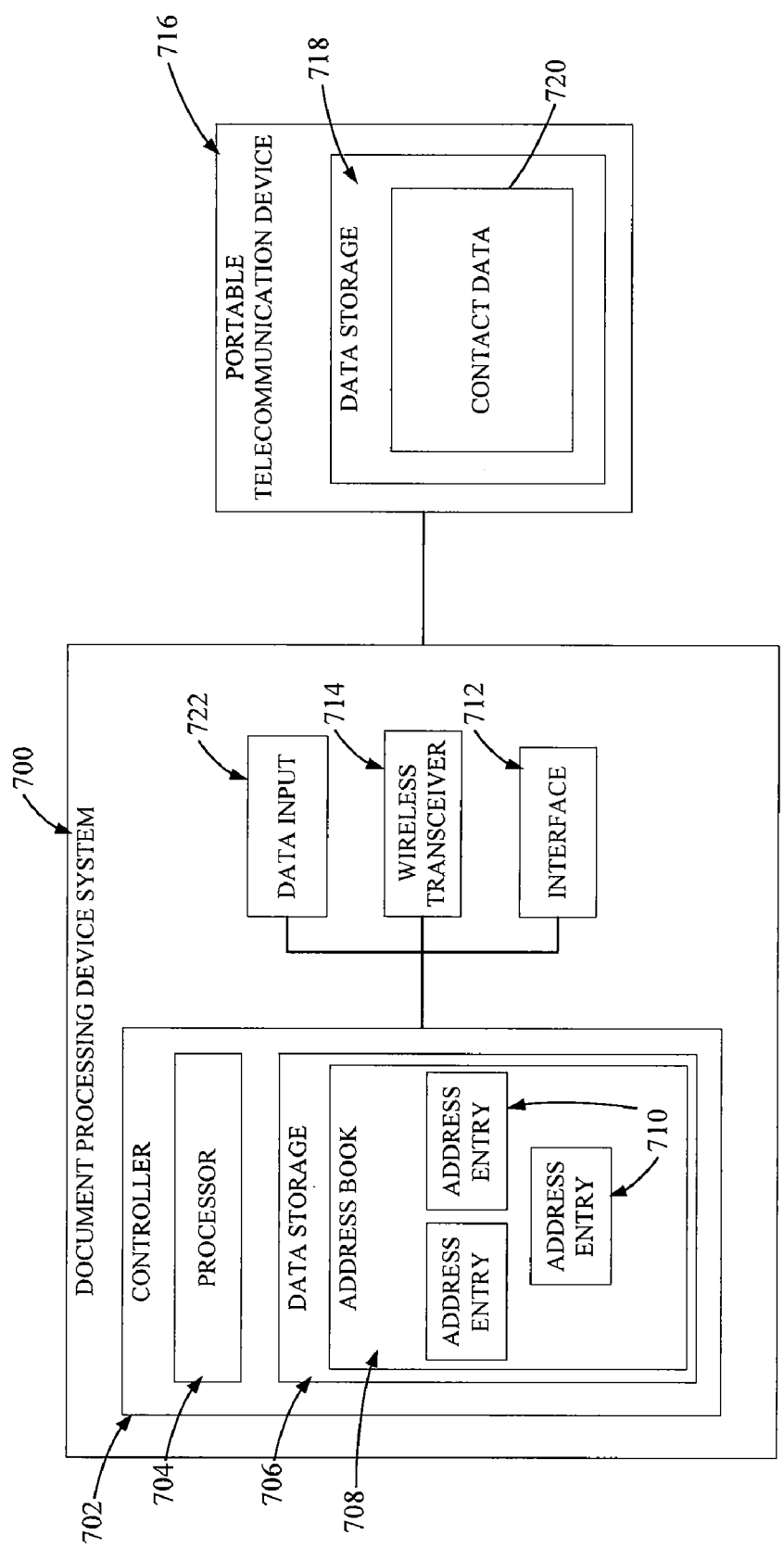
FIG. 7 is a block diagram illustrating the system for obtaining address data from a portable device to a document processing device according to one embodiment of the subject application.

Referring now to FIG. 7, illustrated is a block diagram of a document processing device system 700 for obtaining address data from a portable device in accordance with one embodiment of the subject application. The document processing device 700 of FIG. 7 includes a controller 702 that has a processor 704 in data communication with a data storage 706. The data storage 706 stores an address book 708, which contains multiple address entries 710 that are accessible via the document processing device 700. The document processing device 700 also includes an interface 712 that is configured to selectively retrieve one or more of the address entries 710 from the address book 708 in the data storage 706.

The controller 702 operable to commence at least one document processing operation on the document processing device 700 based upon one or more retrieve address entries 710. The document processing device 700 also includes a wireless transceiver 714 that is configured so as to discover an associated portable telecommunication device 716 that is proximate to the document processing device 700. The telecommunication device 716 includes an integrated data storage 718 that functions to store contact data 720 corresponding to contact information of one or more contact destinations.

The wireless transceiver 714 of the document processing device 700 is also configured to establish a data connection with the portable telecommunications device 716 after the device 716 has been discovered. The document processing device 700 further includes a data input 722 that is capable of receiving the contact data 720 from the from the portable telecommunication device 716. In addition, the controller 702 of the document processing device 700 is further configured to add an entry into the address book 708 that corresponds to the received contact data 720.

Figure 8:
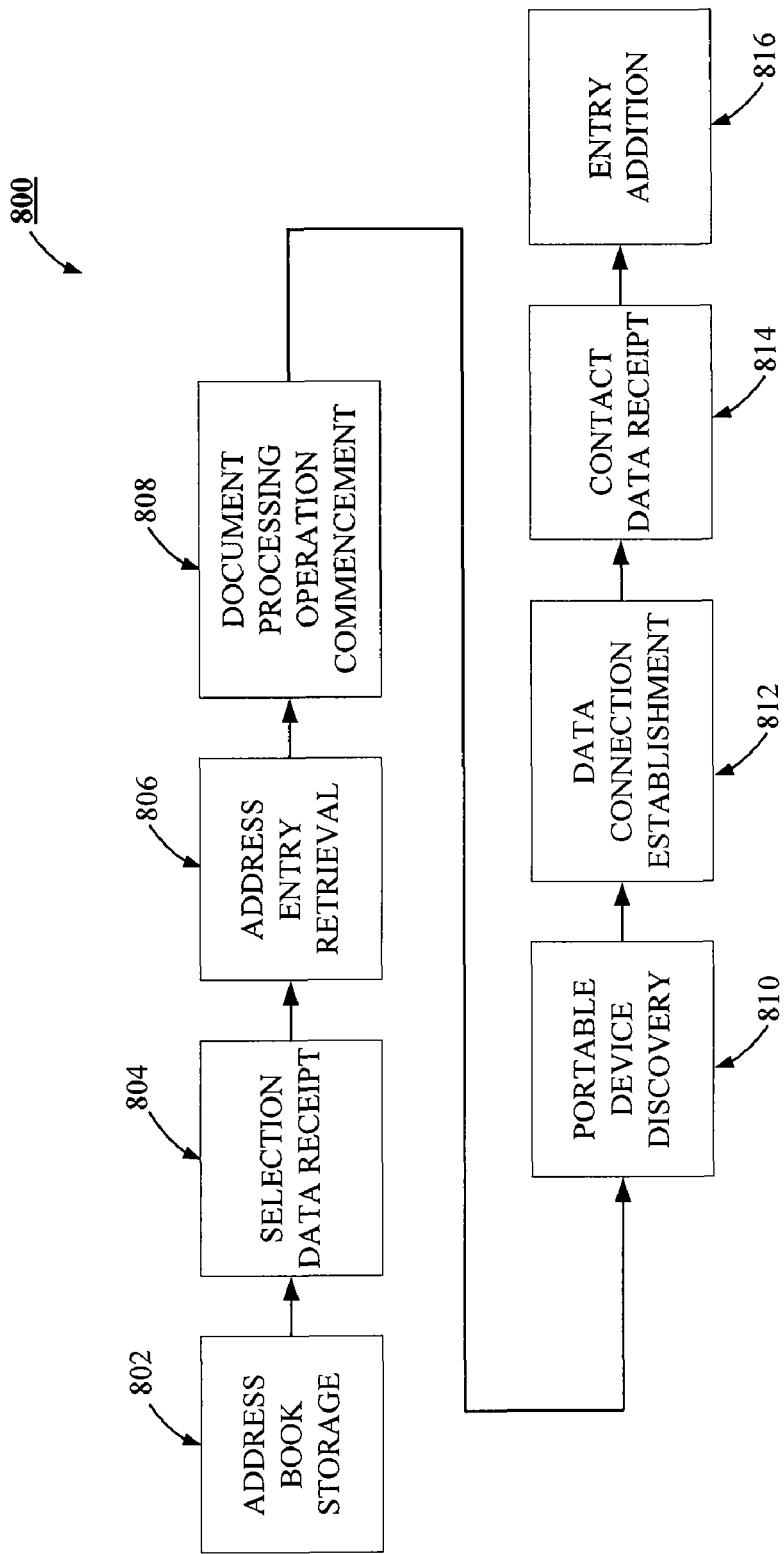
FIG. 8 is a functional diagram illustrating the system for obtaining address data from a portable device to a document processing device according to one embodiment of the subject application.

Turning now to FIG. 8, illustrated is a functional diagram of a system 800 for obtaining address data from a portable device to a document processing device in accordance with one embodiment of the subject application. As shown in FIG. 8, address book storage 802 is first performed of an address book in a data storage associated with a document processing device, e.g. the document processing device 104 of FIG. 1. According to one embodiment of the subject application, the address book includes address entries that are accessible via the document processing device 104. Selection data receipt 804 then occurs of selection data received from an associated user.

Next, address entry retrieval 806 is performed on one or more address entries so as to retrieve the address entry or entries from the address book based upon the received selection data. Document processing operation commencement 808 then occurs, whereupon the document processing device 104 begins operations according to the one or more retrieved address entries. Device discovery 810 is then performed for any portable telecommunication devices 116 and 122 in proximity to the document processing device 104. The telecommunication devices 116 and 122 each includes an integrated data storage that stores contact data, which corresponds to contact information of one or more contact destinations.

Figure 9:
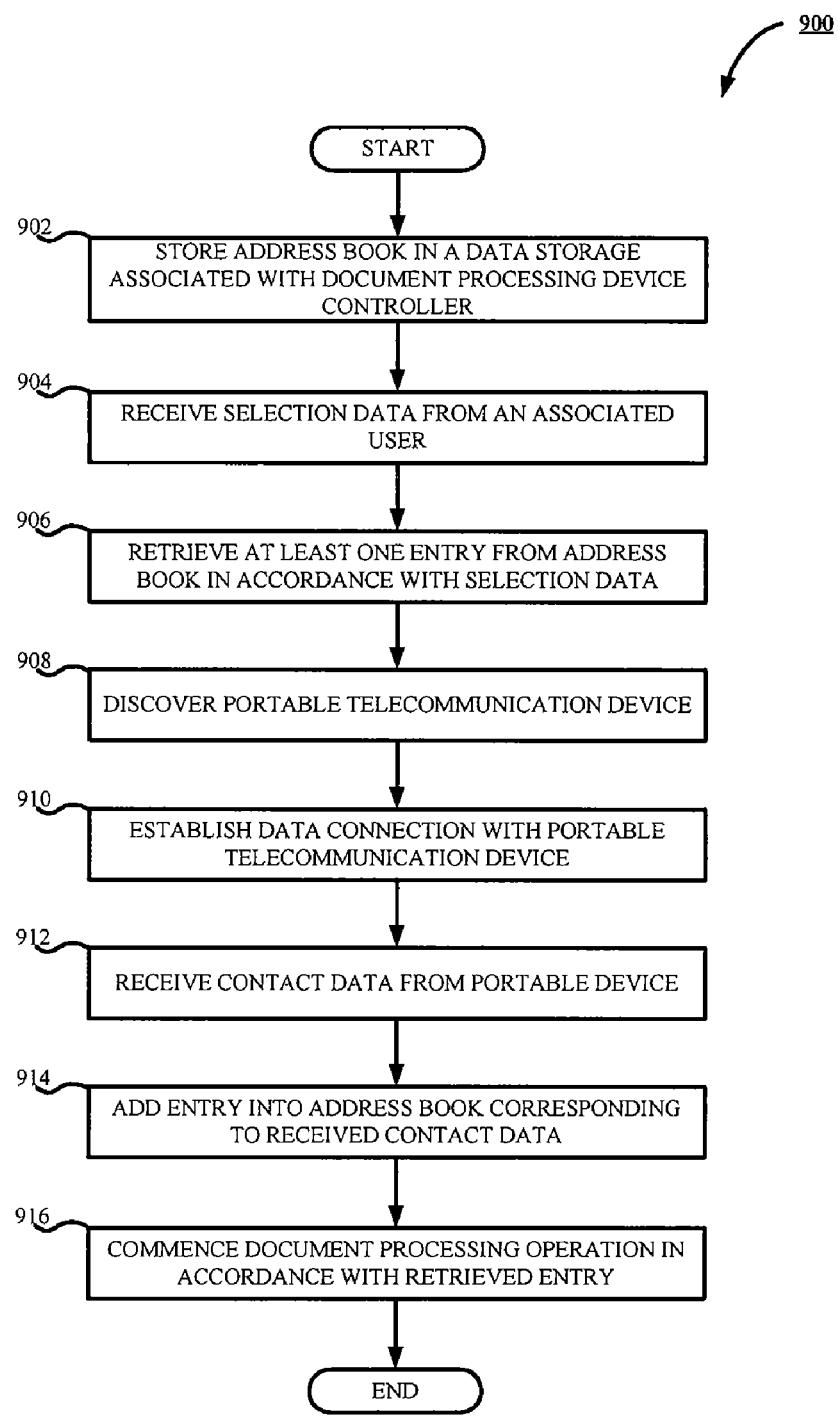
FIG. 9 is a flowchart illustrating a method for obtaining address data from a portable device to a document processing device according to one embodiment of the subject application.

Data connection establishment 812 then occurs such that a data connection with the portable telecommunications device 116 or 122 is established after it is discovered. Contact data receipt 814 then occurs of contact data from the portable telecommunication device 116 or 122. Following contact data receipt 814, entry addition 816 is performed of the contact data as an entry in the address book The skilled artisan will appreciate that the subject system 100 and components described above with respect to FIG. 1, FIG. 2, FIG. 3, FIG. 4, FIG. 5, FIG. 6, FIG. 7, and FIG. 8 will be better understood in conjunction with the methodologies described hereinafter with respect to FIG. 9 and FIG. 10, as well as the illustration of the example embodiment depicted in FIG. 11. Turning now to FIG. 9, there is shown a flowchart 900 illustrating a method for obtaining address data from a portable device to a document processing device in accordance with one embodiment of the subject application. Beginning at step 902, an address book is stored in a data storage that is associated with a document processing device controller, which the controller includes a processor. The address book, according to one embodiment of the subject application, includes a plurality of address entries that are accessible via the document processing device. Selection data is then received from an associated user at step 904.

At step 906, at least one address entry is retrieved from the address book based upon the received selection data. At step 908, an associated portable telecommunication device is discovered proximate to the document processing device. In accordance with one embodiment of the subject application, the telecommunication device has an integrated data storage, which functions to store contact data that corresponds to the contact information of one or more contact destinations. At step 910, a data connection is then established with the portable telecommunication device following its discovery. The contact data is then received from the portable telecommunication device at step 912, and an entry is added into the address book at step 914 corresponding to this received contact data. One or more document processing operations are then commenced on the document processing device, at step 916, in accordance with the one or more retrieved address entries.

Figure 10:
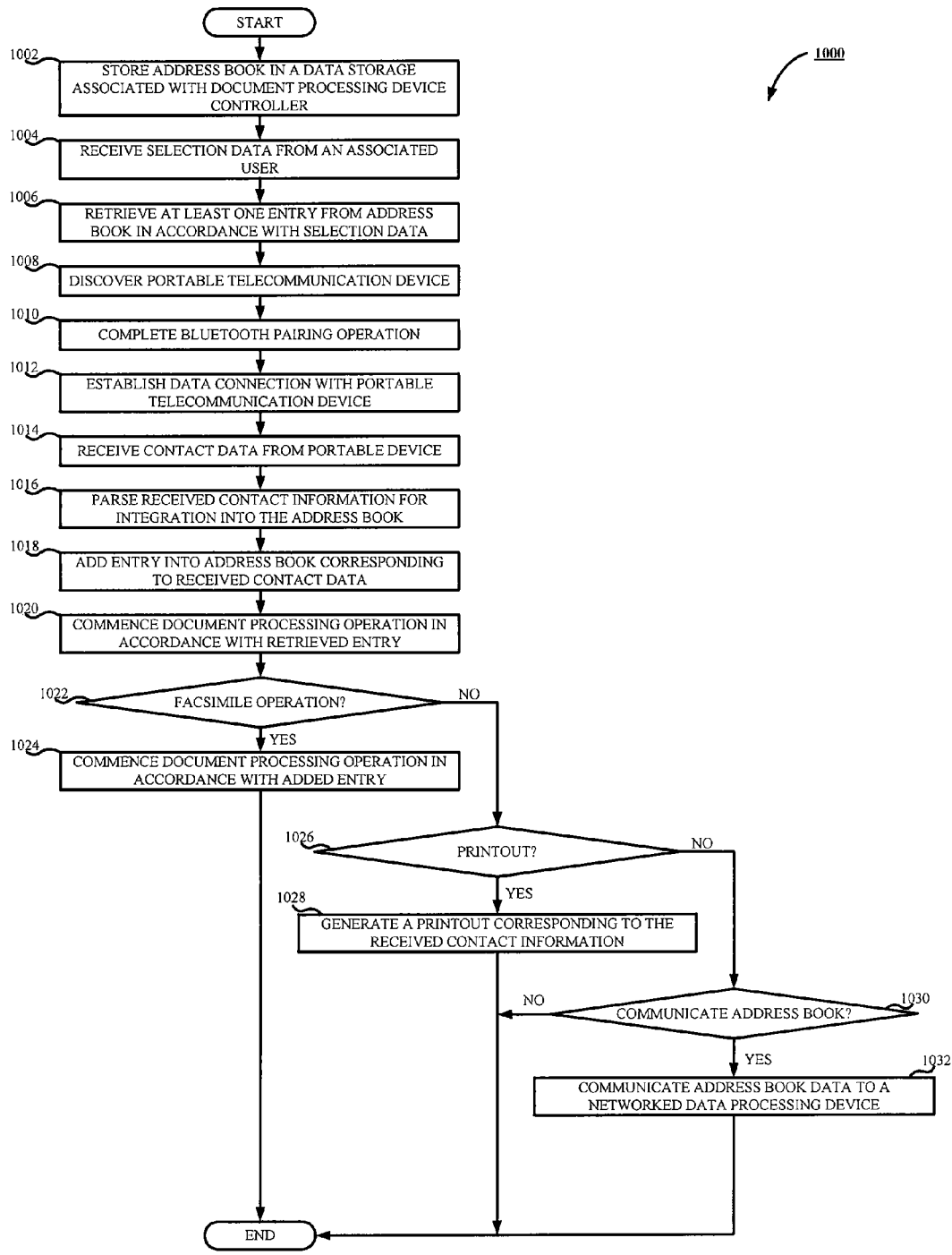
FIG. 10 is a flowchart illustrating a method for obtaining address data from a portable device to a document processing device according to one embodiment of the subject application.

Referring now to FIG. 10, there is depicted a flowchart 1000 illustrating a method for obtaining address data from a portable device to a document processing device in accordance with one example embodiment of the subject application. The methodology of FIG. 10 begins at step 1002, whereupon an address book is stored in the data storage 110 associated with the document processing device 104. According to one embodiment of the subject application, the controller 108, having a processor, is capable of accessing the address book stored on the data storage 110. At step 1004, selection data is received from an associated user by the controller 108 or other suitable component associated with the document processing device 104. The user selection data is capable of being received via the user interface 106, via a web-based portal, a thin client interface, a remotely connected device, or the like. In accordance with one embodiment of the subject application, the user provides login data representative of a suitable authentication necessary for access to the document processing device 104. Such examples of authentication include, for example and without limitation, user identification, login identification, MAC address (associated with the portable telecommunication device 116 or 122), network identification, and the like.

After suitable authentication of the user, at least one entry is then retrieved from the address book stored on the data storage 110 in accordance with the received selection data at step 1006. A portable telecommunications device 116 or 122 is then discovered by the controller 108 or other suitable component associated with the document processing device 104 at step 1008. It will be appreciated by those skilled in the art that for example purposes only with respect to FIG. 10, reference is now made hereinafter to the portable telecommunications device 116 as the initiating portable telecommunications device.

Thus, at step 1010, a BLUETOOTH pairing operation is completed between a suitable component of the controller 108 and a suitable component of the portable telecommunication device 116, so as to establish a data connection, e.g. the link 120, between the portable telecommunications device 116 and the document processing device 104 at step 1012. A more detailed example of the pairing referenced at step 1010 is discussed below with respect to FIG. 11. Contact data is then received by the controller 108 or other suitable component associated with the document processing device 104 via the established data connection 120 from the portable telecommunication device 116 at step 1014. As used herein with respect to FIG. 10, the terms contact data and contact information are used interchangeably. In accordance with one embodiment of the subject application, the contact data is selected by the user from an address book stored on the portable telecommunication device 116. It will be appreciated by those skilled in the art that such data is capable of being, for example and without limitation, in a VCard data format.

The received contact information is then parsed by the controller 108 at step 1016 for integration into the address book stored on the data storage 110 of the document processing device 104. At step 1018, an entry is added to the address book of the document processing device 104 corresponding to the received contact data. In accordance with one embodiment of the subject application, the address book stored on the data storage 110 is capable of being restricted to the user of the portable telecommunication device 116, a particular user identification received from the portable telecommunication device 116, a network login, or other suitable restriction, as will be appreciated by those skilled in the art. At step 1020, one or more document processing operations are then commenced in accordance with the retrieved entry. For example, the document processing device 104 performs a scan to email operation sending the scan job to the recipient designated by the entry, performs a facsimile operation sending the scan job to the facsimile number designated by the entry, or the like.

A determination is then made at step 1022 whether a facsimile operation has been selected by the associated user. Upon a positive determination, flow proceeds to step 1024, whereupon the document processing device 104 commences a facsimile document processing operation in accordance with the newly added entry. That is, the document processing device 104 performs a facsimile transmission to the recipient designated by the newly added entry, after which operations with respect to FIG. 10 terminate. The skilled artisan will appreciate that while a facsimile transmission is referenced at step 1022, other suitable operations regarding transmission of data, e.g. email, scan to inbox, or the like, are also capable of implementation in accordance with the example embodiment of FIG. 10.

Upon a determination at step 1022 that a facsimile operation has not been selected, flow proceeds to step 1026, whereupon a determination is made whether the user associated with the portable telecommunication device 116 has selected to print out the contact information of a selected entry, e.g. a previously stored or newly added entry in the address book in the data storage device 110. When it is determined that a print out has been selected, operations proceed to step 1028, whereupon the document processing device 104 outputs a hard copy of the received contact data. The skilled artisan will thus appreciate that one or more entries of the user's address book are capable of quickly and easily being output to hard-copy form by the document processing device 104.

When it is determined at step 1026 that a print out of the contact information is not requested by the associated user, flow proceeds to step 1030. At step 1030, a determination is made whether the user has selected to communicate the stored address book from the data storage 110 to another portable telecommunication device 122 or other suitable electronic device, e.g. the workstation 128. In the event that no such communication is requested, operations with respect to FIG. 10 terminate. Upon a positive determination at step 1030, flow proceeds to step 1032, whereupon the address book data is communicated to a networked data processing device, e.g. the portable telecommunication device 122, the workstation 128, or the like, via the corresponding communications link 126 or 132, respectively.

Figure 11:
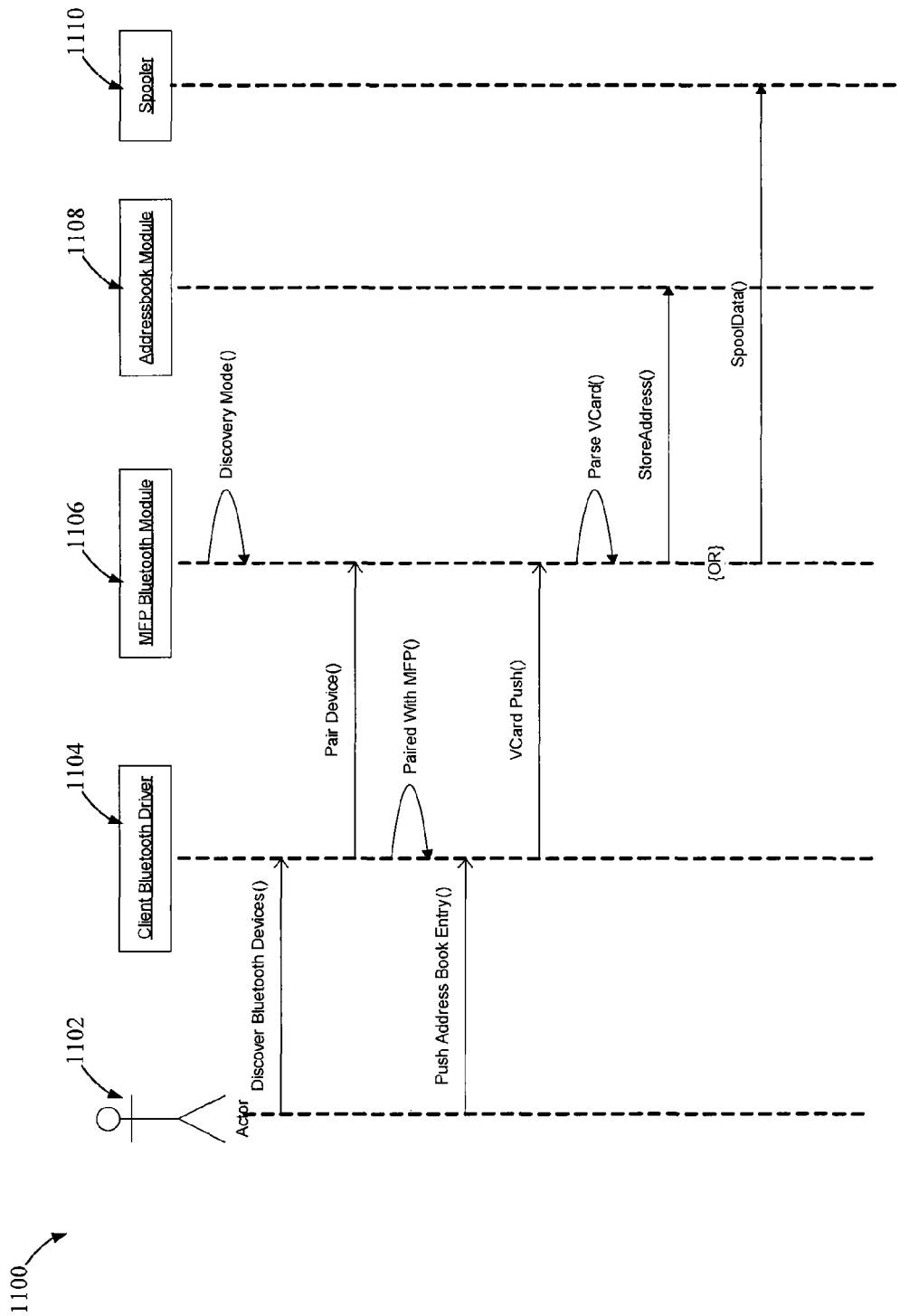
FIG. 11 is an illustration of a sequence diagram depicting an example implementation of the system and method for obtaining address data from a portable device to a document processing device according to one embodiment of the subject application.

Referring now to FIG. 11, there is shown a sequence diagram 1100 of the system and method for obtaining address data from a portable device to a document processing device in accordance with one example embodiment of the subject application. As depicted in the diagram 1100, the actor 1102 initiates a client BLUETOOTH driver 1104 associated with the portable telecommunication device 116 or 122. It will be appreciated by those skilled in the art that the use of BLUETOOTH in FIG. 11 is for illustrative purposes only, and the subject application is capable of implementing any other suitable form of a personal area network. The BLUETOOTH driver 1104 of the portable telecommunication device 1102 performs a discovery action with the driver 1104, as will be understood by the skilled artisan. The client BLUETOOTH driver 1104 then attempts to pair with the document processing device, i.e. the MFP BLUETOOTH module 1106 associated with the controller 108 or other suitable component of the document processing device 104. According to the example embodiment of FIG. 11, the portable telecommunication device 116 or 122 is indicated as the client and thus initiator of the pairing operation. The skilled artisan will appreciate that other embodiments of the subject application enable the document processing device 104 to function as the initiator of the pairing.

Once pairing between the portable telecommunication device 116 or 122 and the document processing device 104 has been obtained, the actor 1102 initiates an address book interaction. According to one embodiment of the subject application, such an interaction includes, for example and without limitation, a printing of the address book, a printout of a selected contact, a storage of the address book, a document processing operation associated with a destination designated by the address book, or the like. In accordance with the example of FIG. 11, the actor 1102 then selects an address book entry for communication to the document processing device 104, e.g. a push action. Via the established BLUETOOTH connection between the client BLUETOOTH driver 1104 and the MFP BLUETOOTH module 1106, a VCard Push is performed. It will be appreciated by those skilled in the art that most mobile telecommunication devices store address book entries in VCard format, thus the communication form the device 116 or 122 to the document processing device 104 is accomplished in this format.

The VCard is then parsed by the MFP BLUETOOTH module of the controller 108 or other suitable component associated with the document processing device 104 and stored in the Address book Module 1108. Preferably, this storage is accomplished in the same VCard format, so as to enable later communication to the same or different portable telecommunication device 116 or 122. The subject application, as illustrated in FIG. 11, further provides for the printing of the submitted entry or entries from the address book of the portable telecommunication device 116 or 122. Thus, the MFP BLUETOOTH module 1106 is capable of communicating the parsed VCard to the Spooler 1110 as spool data for output. It will be appreciated by those skilled in the art that such output includes the translation of the pushed address entry into a printable format by the MFP BLUETOOTH module 1106 such that the Spooler 1110 receives suitable spool data.

The foregoing description of a preferred embodiment of the subject application has been presented for purposes of illustration and description. It is not intended to be exhaustive or to limit the subject application to the precise form disclosed. Obvious modifications or variations are possible in light of the above teachings. The embodiment was chosen and described to provide the best illustration of the principles of the subject application and its practical application to thereby enable one of ordinary skill in the art to use the subject application in various embodiments and with various modifications as are suited to the particular use contemplated. All such modifications and variations are within the scope of the subject application as determined by the appended claims when interpreted in accordance with the breadth to which they are fairly, legally and equitably entitled.

What is claimed:

1. A document processing device comprising:
   a controller including a processor in data communication with a data storage;
   an address book stored in the data storage, the address book including a plurality of address entries accessible via the document processing device;
   an interface operable to selectively retrieve at least one address entry from the address book;
   the controller operable to commence at least one document processing operation on the document processing device in accordance with the at least one retrieved address entry;
   a wireless transceiver operable to discover an associated portable telecommunication device proximate to the document processing device, the telecommunication device having a telecommunications device data storage integrated therewith storing contact data corresponding to contact information of at least one contact destination;
   the wireless transceiver further operable to establish a data connection with the portable telecommunications device after discovery thereof;
   a data input operable to receive the contact data from the from the portable telecommunication device; and
   the controller further operable to add an entry into the address book corresponding to the received contact data.

2. The document processing device of claim 1 wherein the wireless transceiver is comprised of a Bluetooth device, and wherein discovery of the portable telecommunication device is a Bluetooth pairing.

3. The document processing device of claim 1 wherein contact data is comprised of an address entry in a vCard data interchange format.

4. The document processing device of claim 1 further comprising a data parser operable to parse the received contact information for integration into the address book.

5. The document processing device of claim 1 wherein the controller is further operable to commence at least one document processing operation in accordance with the added entry, which document processing operation includes a facsimile transmission directed to a recipient specified by the added entry.

6. The document processing device of claim 1 further comprising a printer operable to generate a printout corresponding to the received contact data.

7. The document processing device of claim 1 further comprising an output operable to communicate address book data to an associated, networked data processing device.

8. A method of obtaining address data from a portable device to a document processing device comprising:

storing an address book in a data storage associated with a document processing device controller including a processor, the address book including a plurality of address entries accessible via the document processing device;

receiving selection data from an associated user; retrieving at least one address entry from the address book in accordance with received selection data;

commencing at least one document processing operation on the document processing device in accordance with the at least one retrieved address entry;

discovering, via a wireless transceiver, an associated portable telecommunication device proximate to the document processing device, the telecommunication device having a telecommunications device data storage integrated therewith storing contact data corresponding to contact information of at least one contact destination;

establishing a data connection with the portable telecommunications device after discovery thereof;

receiving the contact data from the from the portable telecommunication device; and adding an entry into the address book corresponding to the received contact data.

9. The method of claim 8 wherein the wireless transceiver is comprised of a Bluetooth device, and wherein discovery of the portable telecommunication device includes the step of completing a Bluetooth pairing operation.

10. The method claim 8 wherein contact data is comprised of an address entry in a vCard data interchange format.

11. The method of claim 8 further comprising parsing the received contact information for integration into the address book.

12. The method of claim 8 further comprising commencing least one document processing operation in accordance with the added entry, which document processing operation includes a facsimile transmission directed to a recipient specified by the added entry.

13. The method of claim 8 further comprising generating a printout corresponding to the received contact data.

14. The method of device of claim 8 further comprising communicating address book data to an associated, networked data processing device.

15. A system of obtaining address data from a portable device to a document processing device comprising:

a controller including a processor in data communication with a data storage;

means adapted for storing an address book in a data storage associated with a document processing device controller including a processor, the address book including a plurality of address entries accessible via the document processing device;

means adapted for receiving selection data from an associated user;

means adapted for retrieving at least one address entry from the address book in accordance with received selection data;

means adapted for commencing at least one document processing operation on the document processing device in accordance with the at least one retrieved address entry;

means adapted for discovering, via a wireless transceiver, an associated portable telecommunication device proximate to the document processing device, the telecommunication device having a telecommunications device data storage integrated therewith storing contact data corresponding to contact information of at least one contact destination;

means adapted for establishing a data connection with the portable telecommunications device after discovery thereof;

means for adapted receiving the contact data from the portable telecommunication device; and means adapted for adding an entry into the address book corresponding to the received contact data.

16. The system of claim 15 wherein the wireless transceiver is comprised of a Bluetooth device, and wherein discovery of the portable telecommunication device includes the step of completing a Bluetooth pairing operation.

17. The system claim 15 wherein contact data is comprised of an address entry in a vCard data interchange format.

18. The system of claim 15 further comprising means adapted for parsing the received contact information for integration into the address book.

19. The system of claim 15 further comprising means adapted for commencing least one document processing operation in accordance with the added entry, which document processing operation includes a facsimile transmission directed to a recipient specified by the added entry.

20. The system of claim 15 further comprising means adapted for generating a printout corresponding to the received contact data.

* * * * *